(12) United States Patent
Takahashi

(10) Patent No.: US 10,714,858 B2
(45) Date of Patent: Jul. 14, 2020

(54) CONNECTOR AND ELECTRONIC APPARATUS

(71) Applicant: FUJITSU LIMITED, Kawasaki-shi, Kanagawa (JP)

(72) Inventor: Koki Takahashi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/351,591

(22) Filed: Mar. 13, 2019

(65) Prior Publication Data
US 2019/0326696 A1 Oct. 24, 2019

(30) Foreign Application Priority Data

Apr. 20, 2018 (JP) ................................. 2018-081633

(51) Int. Cl.
| | | |
|---|---|---|
| *H01R 12/00* | (2006.01) | |
| *H01R 13/24* | (2006.01) | |
| *H01R 13/641* | (2006.01) | |
| *H01R 13/74* | (2006.01) | |
| *G06F 1/16* | (2006.01) | |

(52) U.S. Cl.
CPC ..... *H01R 13/2407* (2013.01); *H01R 13/2478* (2013.01); *H01R 13/641* (2013.01); *H01R 13/743* (2013.01); *G06F 1/1632* (2013.01)

(58) Field of Classification Search
CPC .............. H01R 13/2407; H01R 13/641; H01R 13/2478; H01R 13/743; H01R 43/16; H01R 13/2428; G06F 1/1632; H04M 1/0274

USPC .......................................................... 439/65
See application file for complete search history.

(56) References Cited

U.S. PATENT DOCUMENTS

| | | | | |
|---|---|---|---|---|
| 5,047,596 A | * | 9/1991 | Ebishi | G05G 9/04792 200/315 |
| 5,151,563 A | * | 9/1992 | Tanaka | B60R 1/07 200/16 C |
| 5,197,573 A | * | 3/1993 | De La Fuente | F16F 7/02 188/129 |
| 5,471,729 A | * | 12/1995 | Zoltaszek | B21J 15/043 29/243.521 |
| 2019/0359473 A1 | * | 11/2019 | Miner | B64D 39/06 |

FOREIGN PATENT DOCUMENTS

| | | |
|---|---|---|
| JP | 61-199171 U | 12/1986 |
| JP | 2016-076320 | 5/2016 |

* cited by examiner

*Primary Examiner* — Jean F Duverne
(74) *Attorney, Agent, or Firm* — Fujitsu Patent Center

(57) ABSTRACT

A connector includes a casing configured to include a first contactor, a slider capable of insertion into the casing and configured to include a second contactor, an elastic body provided in the casing, the elastic body causing the slider to protrude from the casing, and a movable spherical body rotatably provided at a tip of the slider, wherein, when the slider is inserted into the casing, the first contactor comes in contact with the second contactor and the slider is moved in an intersecting direction that intersects an insertion direction of the slider.

20 Claims, 18 Drawing Sheets

CONNECTOR AND ELECTRONIC APPARATUS

CROSS-REFERENCE TO RELATED APPLICATION

This application is based upon and claims the benefit of priority of the prior Japanese Patent Application No. 2018-81633, filed on Apr. 20, 2018, the entire contents of which are incorporated herein by reference.

FIELD

The embodiment discussed herein is related to a connector and an electric apparatus.

BACKGROUND

There is a connector provided with a casing, a slider that is insertable into the casing, an elastic body for causing the slider to protrude from the casing, and a movable spherical body that is rotatably provided at a tip portion of the slider and comes into contact with a contact point of a counterpart connector (for example, see Japanese Laid-open Patent Publication No. 2016-76320 and Japanese Unexamined Utility Model Registration Publication No. 61-199171).

SUMMARY

According to an aspect of the embodiments, a connector includes a casing configured to include a first contactor, a slider capable of insertion into the casing and configured to include a second contactor, an elastic body provided in the casing, the elastic body causing the slider to protrude from the casing, and a movable spherical body rotatably provided at a tip of the slider, wherein, when the slider is inserted into the casing, the first contactor comes in contact with the second contactor and the slider is moved in an intersecting direction that intersects an insertion direction of the slider.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

In the above connector, the contact point of the counterpart connector repeatedly comes into contact with the same portion of the movable spherical body, and there is a possibility that the corresponding portion is damaged. If the portion of the movable spherical body with which the contact point of the counterpart connector comes into contact is damaged, there is a possibility of causing poor connection between the counterpart connector and the movable spherical body.

Hereinafter, an embodiment of a technique capable of suppressing damage to a movable spherical body to be disclosed by the present application will be described.

[Electronic Apparatus]

Figure 1:
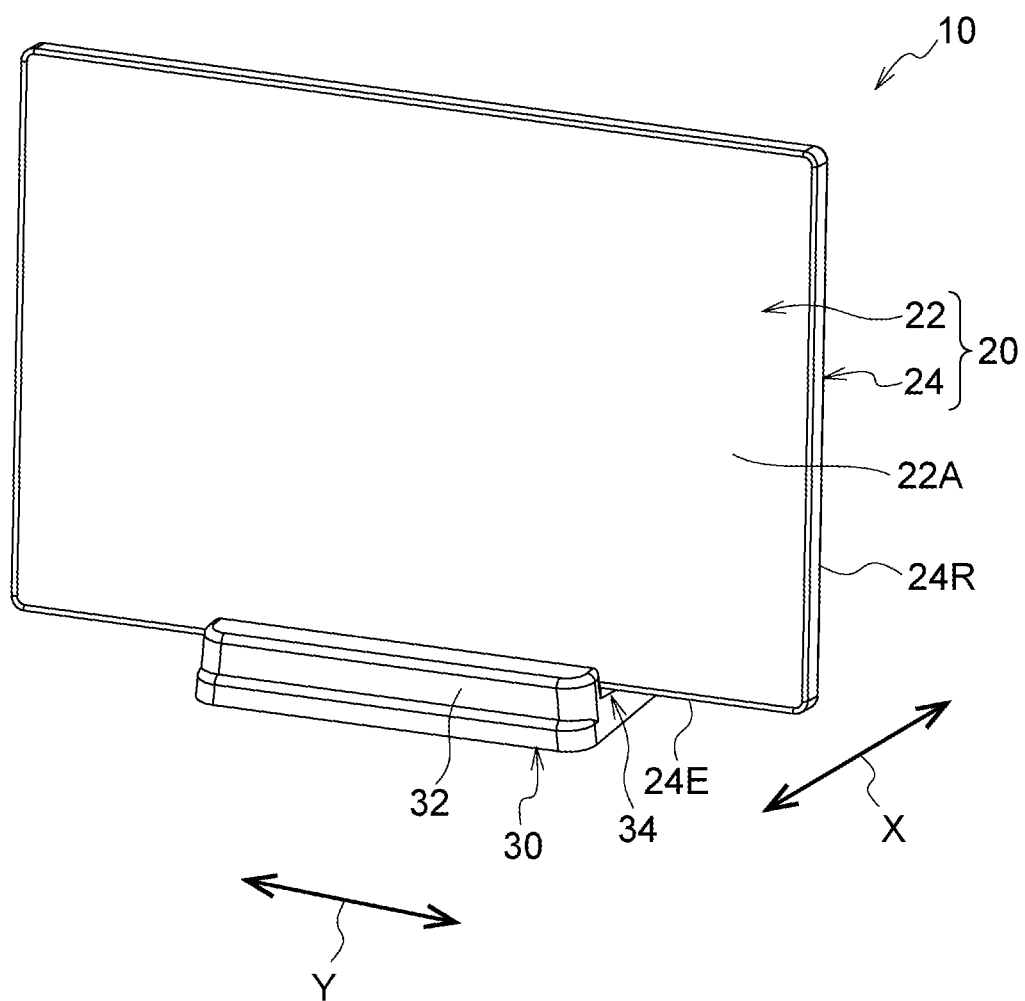
FIG. 1 is a perspective view illustrating a state of an electronic apparatus according to one embodiment as viewed from the front side.
Figure 2:
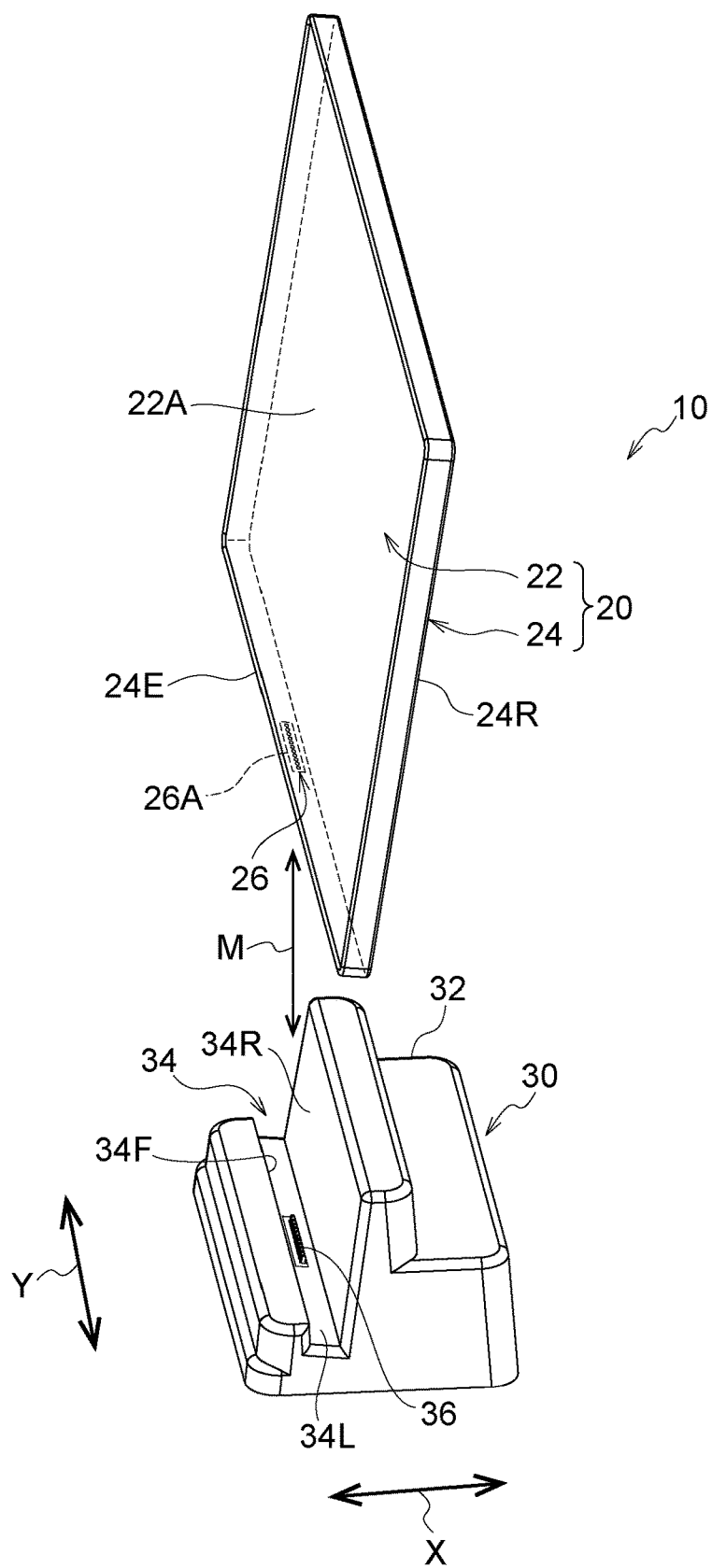
FIG. 2 is a perspective view illustrating a state in which a main body device of the electronic apparatus is detached from an expansion device in FIG. 1.

FIGS. 1 and 2 illustrate an electronic apparatus 10. The electronic apparatus 10 includes a main body device 20 and an expansion device 30 detachably attached to the main body device 20.

[Main Body Device]

The main body device 20 is, for example, a portable terminal such as a tablet or a mobile phone. The main body device 20 is formed in a rectangular shape when viewed from the thickness direction thereof. The main body device 20 includes a display unit 22 and a casing 24.

The display unit 22 is, for example, a liquid crystal display. The display unit 22 includes a display surface 22A for displaying images, videos, and the like. The display unit 22 is housed in the casing 24. The display surface 22A of the display unit 22 may be an operation surface on which a user may perform a touch operation with a finger, a pen, or the like.

The casing 24 is formed in a thin box shape. The casing 24 covers the display unit 22 from the rear surface that is the surface opposite to the display surface 22A side. A printed circuit board (not illustrated) is housed in the casing 24. On this printed circuit board, for example, a plurality of electronic components such as a central processing unit (CPU) and a memory are mounted.

[Main Body Device Side Connector]

As illustrated in FIG. 2, a main body device side connector 26 is provided in the central portion of one end portion 24E of the casing 24. The main body device side connector 26 is electrically connected to the printed circuit board housed in the casing 24.

The main body device side connector 26 has a contact point 26A. The contact point 26A is formed of a conductive metal or the like. The contact point 26A may be electrically connected to an expansion device side connector 36 of the expansion device 30 to be described later.

[Expansion Device]

The expansion device 30 is, for example, a cradle or a port replicator that charges the main body device 20 and expands the function of the main body device 20. This expansion device 30 has a casing 32. A printed circuit board (not illustrated) is housed in the casing 32. On this printed circuit board, a plurality of electronic components such as a CPU and a memory are mounted. The expansion device 30 is an example of an electronic device.

Arrows X illustrated in each drawing indicate the front-rear direction of the expansion device 30. Arrows Y illustrated in each drawing indicate the lateral width direction of the expansion device 30. Arrows M illustrated in each drawing indicate the attaching and detaching direction of the main body device 20 with respect to the expansion device 30.

The casing 32 is formed in a stand shape to hold the main body device 20 in an upright state. This casing 32 has a mounting portion 34 to which the main body device 20 is detachably attached. The mounting portion 34 is formed in a groove shape extending in the lateral width direction (the direction of the arrow Y) of the casing 32 and having the side (the upper side) of the main body device 20 opened. One end portion 24E of the main body device 20 is detachably inserted (mounted) into the mounting portion 34 from above.

The mounting portion 34 has a bottom wall portion 34L, a front wall portion 34F, and a rear wall portion 34R. The front wall portion 34F and the rear wall portion 34R extend from the bottom wall portion 34L to the main body device 20 side (upper side). The front wall portion 34F and the rear wall portion 34R face each other in the front-rear direction of the expansion device 30.

The front wall portion 34F faces the display surface 22A of the main body device 20 in a state in which the one end portion 24E of the main body device 20 is inserted into the mounting portion 34. On the other hand, the rear wall portion 34R faces the rear surface 24R of the casing 24 of the main body device 20 in a state where the one end portion 24E of the main body device 20 is inserted into the mounting portion 34.

[Expansion Device Side Connector]

Figure 3:
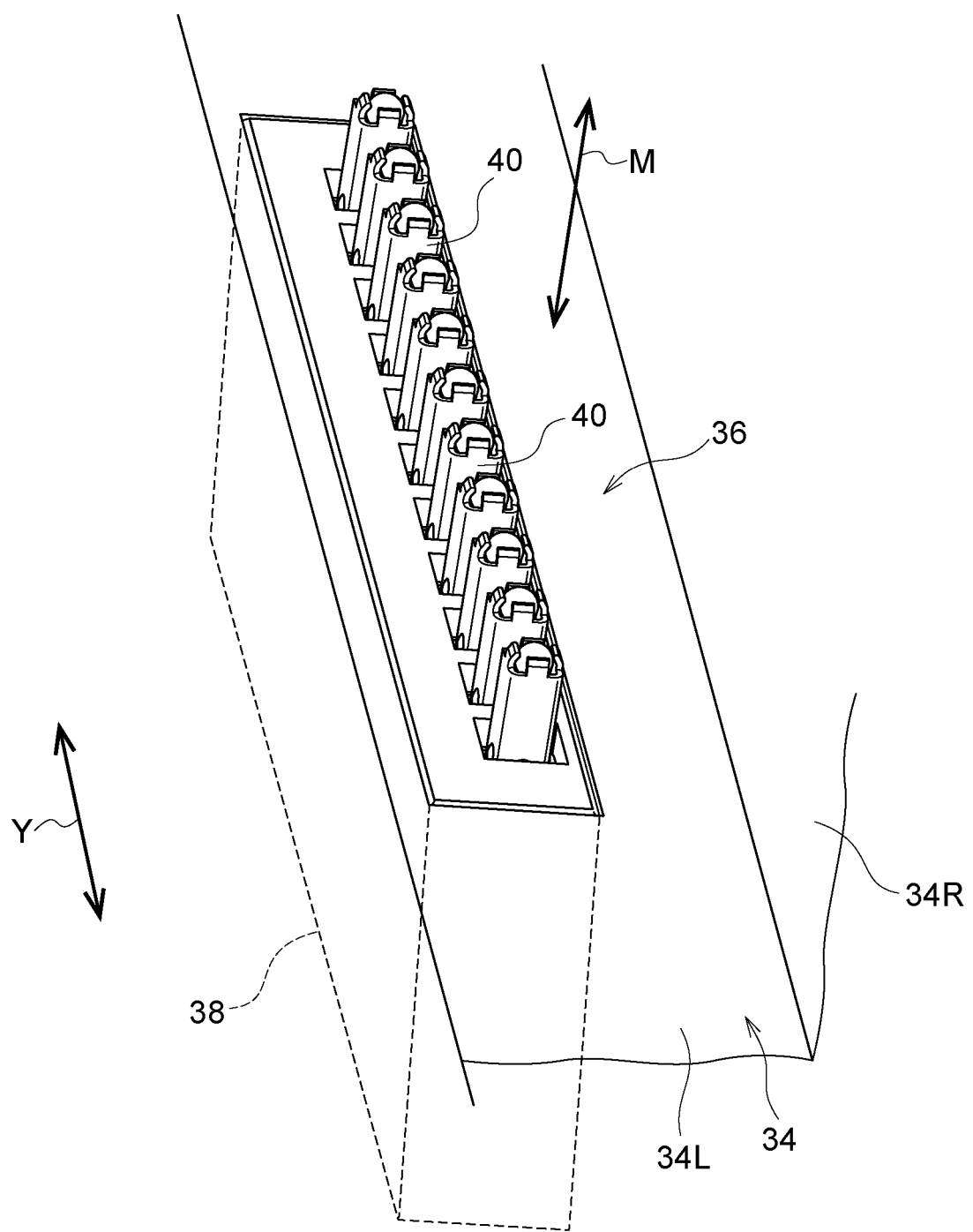
FIG. 3 is a perspective view illustrating an expansion device side connector illustrated in FIG. 2.

As illustrated in FIG. 3, the expansion device side connector 36 is provided at the center portion in the longitudinal direction of the bottom wall portion 34L. The expansion device side connector 36 has a housing 38 and a plurality of spring connectors 40.

The housing 38 is formed in a rectangular parallelepiped shape extending in the longitudinal direction (the direction of the arrow Y) of the bottom wall portion 34L by, for example, resin or the like. The housing 38 houses the plurality of spring connectors 40. The plurality of spring connectors 40 are arranged in the longitudinal direction of the bottom wall portion 34L. Each of the plurality of spring connectors 40 is disposed along the attaching and detaching direction (the direction of the arrow M) of the main body device 20.

[Spring Connector]

Figure 4:
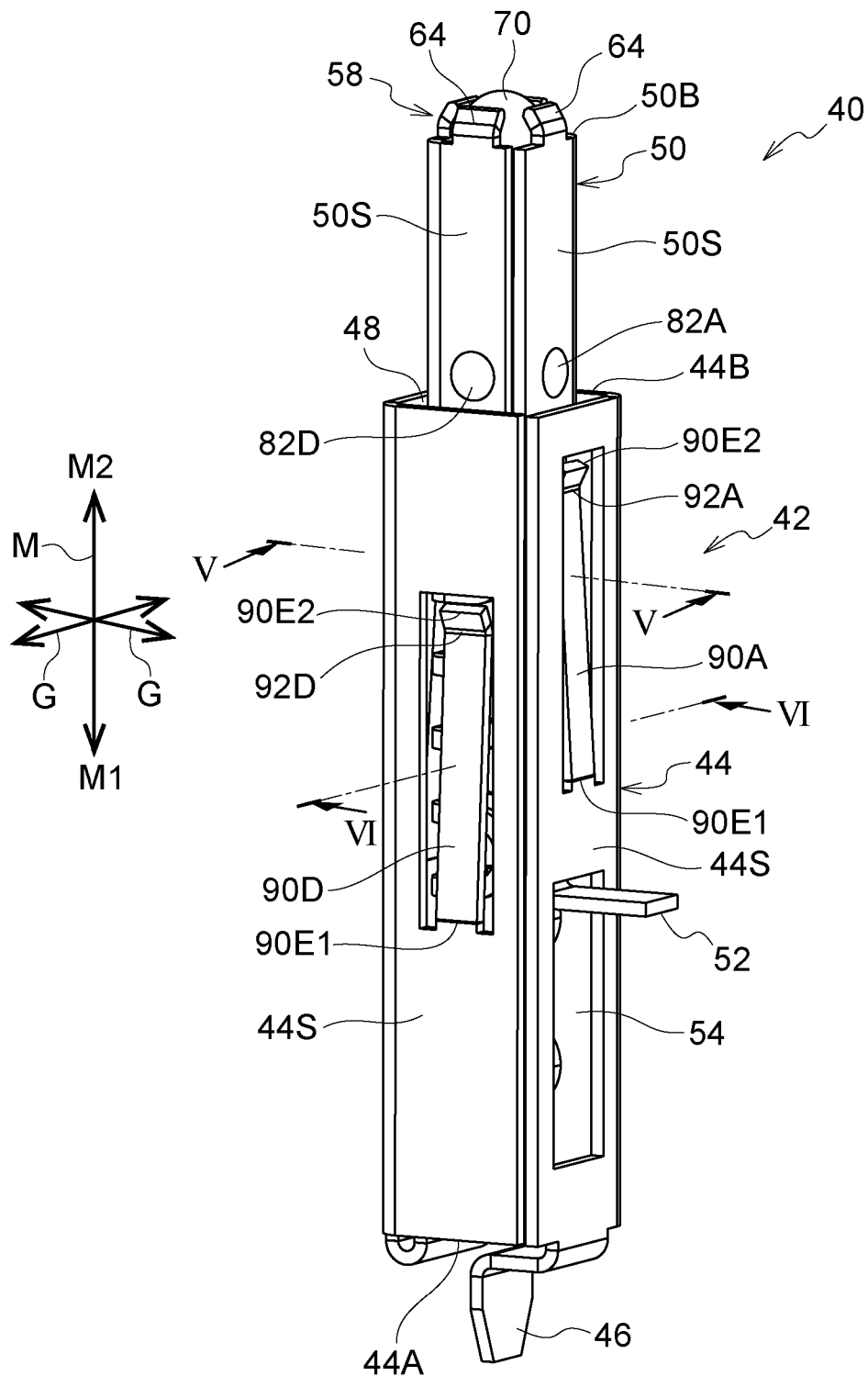
FIG. 4 is a perspective view illustrating a spring connector illustrated in FIG. 3.
Figure 5:
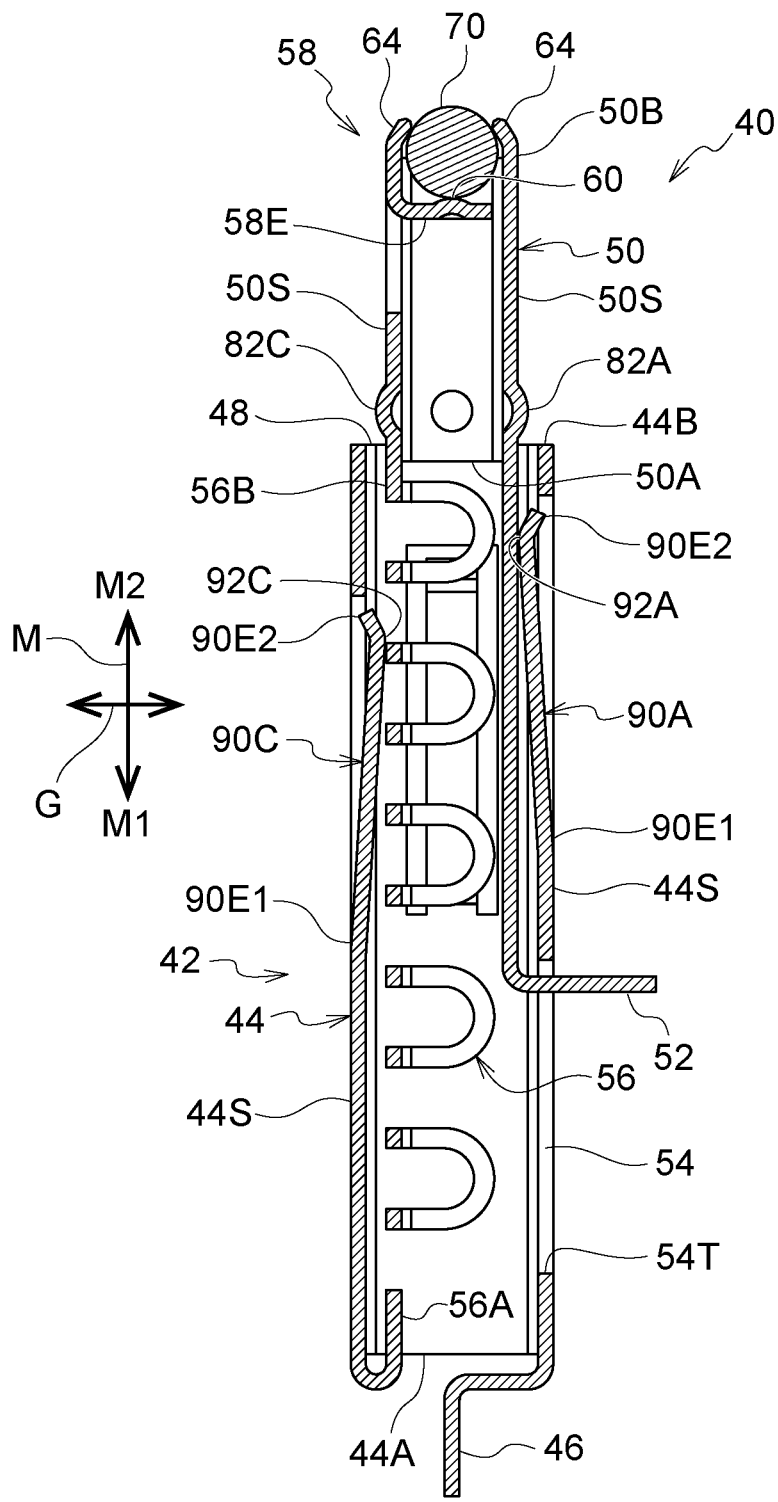
FIG. 5 is a cross-sectional view taken along the line V-V of FIG. 4.
Figure 6:
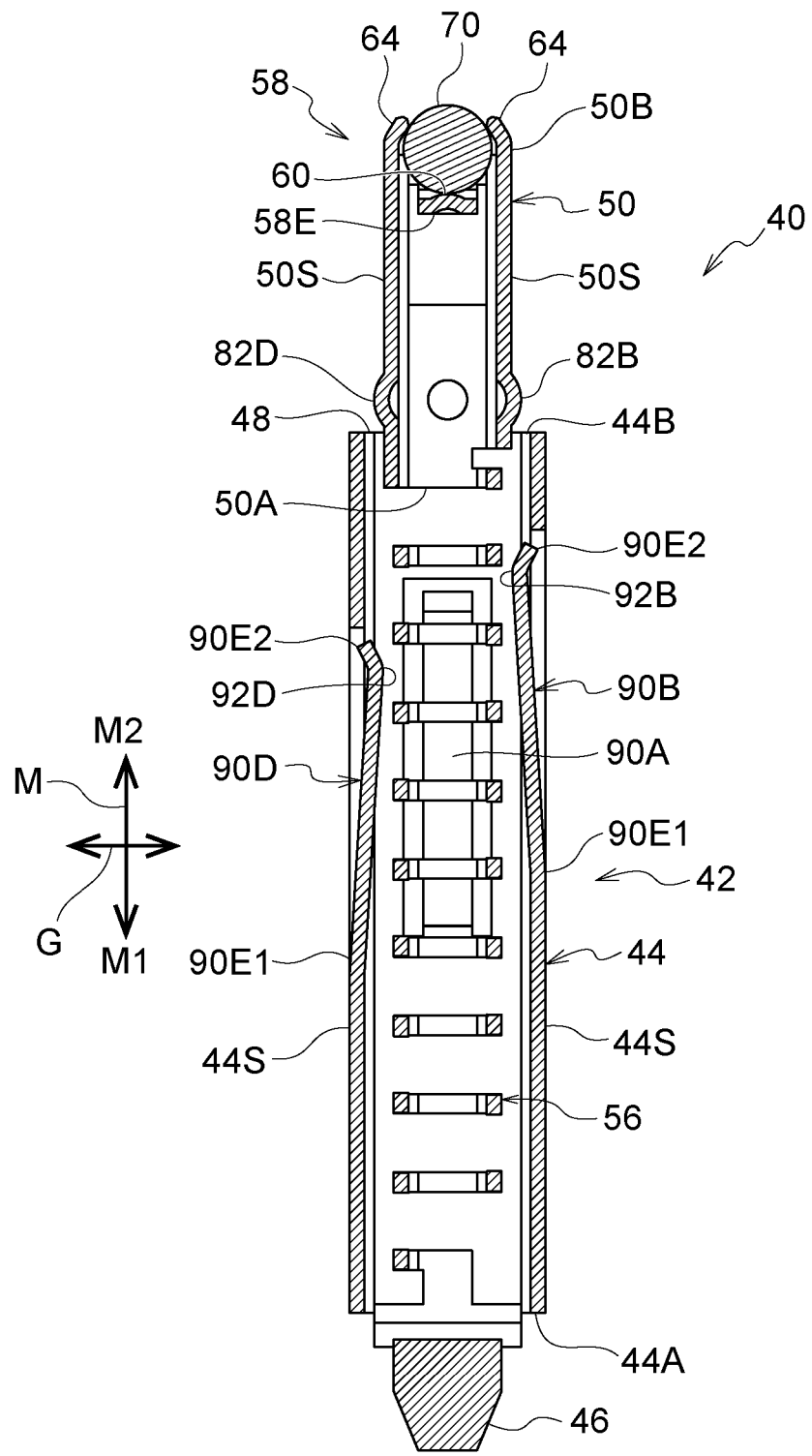
FIG. 6 is a cross-sectional view taken along the line VI-VI of FIG. 4.

As illustrated in FIGS. 4, 5, and 6, the spring connector 40 is formed of a conductive metal plate. This spring connector 40 has a casing 42, a slider 50, an elastic body 56 (see FIG. 5), a movable spherical body 70, and a slider swinging mechanism. The casing 42, the slider 50, the elastic body 56, and the movable spherical body 70 may be electrically connected to each other. The spring connector 40 is an example of a connector.

[Casing]

The casing 42 has a hollow portion 44 and a terminal portion 46. The hollow portion 44 is formed in the shape of a hollow bar extending in the longitudinal direction (the direction of the arrow M) of the spring connector 40. The cross-sectional shape of the hollow portion 44 is rectangular. The hollow portion 44 has four side wall portions 44S.

As illustrated in FIGS. 5 and 6, the terminal portion 46 is provided at one end portion 44A in the longitudinal direction (the direction of the arrow M) of the hollow portion 44. The terminal portion 46 is bent in an L shape. The terminal portion 46 protrudes from the one end portion 44A of the hollow portion 44. The terminal portion 46 is electrically connected to a printed circuit board (not illustrated) housed in the casing 32 of the expansion device 30. An opening 48 is formed in the other end portion 44B in the longitudinal direction of the hollow portion 44.

[Slider]

Inside the hollow portion 44, the slider 50 and the elastic body 56 are housed. The slider 50 is formed in the shape of a hollow bar extending in the attaching and detaching direction of the main body device 20. The cross-sectional shape of the slider 50 is rectangular. The slider 50 has four side wall portions 50S.

The slider 50 is slidably inserted (housed) into the hollow portion 44 from the opening 48 of the hollow portion 44. As the slider 50 slides with respect to the hollow portion 44, the slider 50 is shifted between a standby state of protruding from the opening 48 of the hollow portion 44 and an insertion state of being inserted into the hollow portion 44.

The sliding direction of the slider 50 with respect to the casing 42 (the hollow portion 44) coincides with the attaching and detaching direction (the direction of the arrow M) of the main body device 20. An arrow M1 indicates the insertion direction in which the slider 50 is inserted into the casing 42. An arrow M2 indicates a protruding direction in which the slider 50 protrudes from the inside of the casing 42.

An engaging arm portion 52 is provided at one end portion 50A of the slider 50 in the longitudinal direction. The engaging arm portion 52 extends from the one end portion 50A of the slider 50 to the one end portion 44A side of the hollow portion 44 and is bent to the outside of the hollow portion 44. The engaging arm portion 52 is inserted into a stopper opening 54 formed in the side wall portion 44S of the hollow portion 44.

The stopper opening 54 is formed in a rectangular shape along the sliding direction of the slider 50. The engaging arm portion 52 is movably inserted into the stopper opening 54 in the sliding direction of the slider 50. The edge portion of the stopper opening 54 on the insertion direction (the direction of the arrow M1) side of the slider 50 serves as a stopper portion 54T. By engaging the engaging arm portion 52 with the stopper portion 54T, the sliding of the slider 50 in the insertion direction with respect to the casing 42 (the hollow portion 44) is restricted.

[Elastic Body]

The slider 50 and the casing 42 are connected via the elastic body 56. The elastic body 56 is formed, for example, by a metal wire meandering in an S shape (see FIG. 9A). The elastic body 56 may be expanded and contracted in the sliding direction of the slider 50.

One end portion 56A of the elastic body 56 in the expansion and contraction direction is joined to the one end portion 44A of the hollow portion 44. The other end portion 56B of the elastic body 56 in the expansion and contraction direction is joined to the one end portion 50A of the slider 50. The slider 50 and the casing 42 are connected via the elastic body 56.

In the natural state of the elastic body 56, the slider 50 is held in a state of protruding from the opening 48 of the hollow portion 44. The natural state of the elastic body 56 is the standby state of the slider 50.

On the other hand, when the slider 50 is inserted into the hollow portion 44, the elastic body 56 is compressed, and the slider 50 is changed from the standby state to the insertion state. In this insertion state, the slider 50 is biased in a direction (the direction of the arrow M2) protruding from the opening of the hollow portion 44 by the restoring force of the elastic body 56.

[Spherical Body Housing Portion and Movable Spherical Body]

Figure 7:
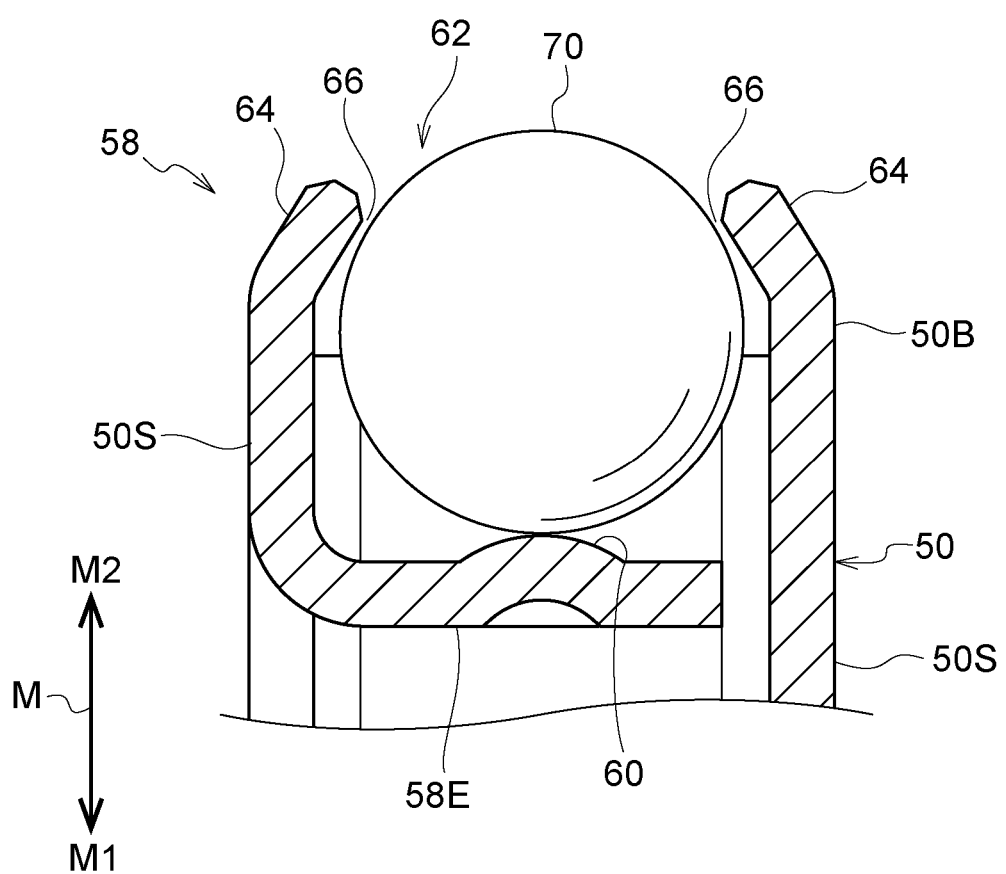
FIG. 7 is an enlarged view illustrating a movable spherical body illustrated in FIG. 5.

As illustrated in FIG. 7, a spherical body housing portion 58 is formed at the other longitudinal end portion (hereinafter, referred to as "tip portion 50B") of the slider 50. The movable spherical body 70 is rotatably housed in the spherical body housing portion 58. The movable spherical body 70 is formed in a spherical shape with a conductive metal such as copper.

The spherical body housing portion 58 is formed in a box shape in which the tip end side of the slider 50 is opened. The spherical body housing portion 58 has four side wall portions 50S that form a tip portion 50B of the slider 50, and a partition wall portion 58E disposed inside the tip portion 50B of the slider 50.

The partition wall portion 58E is formed, for example, by a part of the side wall portion 50S cut and raised inside the slider 50. The inside of the slider 50 is partitioned by this partition wall portion 58E. Thus, the spherical body housing portion 58 for housing the movable spherical body 70 is formed at the tip portion 50B of the slider 50. At the central portion of the partition wall portion 58E, a protruding portion 60 protruding into the spherical body housing portion 58 is formed. The movable spherical body 70 is point-supported by the protruding portion 60. The movable spherical body 70 may be electrically connected to the slider 50 via the protruding portion 60.

The spherical body housing portion 58 has an exposure port 62. The exposure port 62 is formed on the tip end side of the slider 50. A part of movable spherical body 70 is exposed from the exposure port 62. Claw portions 64 are respectively provided on the tip end sides of the four side wall portions 50S of the slider 50. Each claw portion 64 is inclined toward the inside of the spherical body housing portion 58. Thereby, the movable spherical body 70 is suppressed from coming out from the exposure port 62.

A gap 66 is formed between the movable spherical body 70 and each claw portion 64 in a state where the movable spherical body 70 and the protruding portion 60 are in contact with each other. Thus, the movable spherical body 70 is easily rotated within the spherical body housing portion 58. The contact point 26A of the main body device side connector 26 of the main body device 20 comes into contact with a part of the movable spherical body 70 exposed from the exposure port 62. As a result, the main body device side connector 26 and the expansion device side connector 36 are electrically connected.

[Slider Swinging Mechanism]

As illustrated in FIGS. 5 and 6, the slider 50 is movably housed in the hollow portion 44 of the casing 42 in an intersecting direction (the direction of an arrow G) that intersects the sliding direction (the direction of the arrow M). As the slider 50 slides with respect to the hollow portion 44, the slider 50 is swung in the intersecting direction by the slider swinging mechanism.

Specifically, the slider swinging mechanism includes a plurality of slider-side contact portions 82A, 82B, 82C, and 82D, a plurality of elastic piece portions 90A, 90B, 90C, and 90D, a plurality of casing-side contact portions 92A, 92B, 92C, and 92D. A casing-side contact portion of the casing-side contact portions 92A, 92B, 92C, and 92D is an example of a first contactor and a slider-side contact portion of the slider-side contact portions 82A, 82B, 82C, and 82D is an example of a second contactor.

The plurality of slider-side contact portions 82A, 82B, 82C, and 82D are respectively provided on the four side wall portions 50S of the slider 50. Each of the slider-side contact portions 82A, 82B, 82C, and 82D protrudes from the outer wall surface of the side wall portion 50S in a protruding manner. The plurality of slider-side contact portions 82A, 82B, 82C, and 82D are disposed so as to be displaced in the circumferential direction of the hollow portion 44. The plurality of slider-side contact portions 82A, 82B, 82C, and 82D are disposed at the same position in the sliding direction of the slider 50.

The plurality of casing-side contact portions 92A, 92B, 92C, and 92D are provided on the inner wall surface of the hollow portion 44 and protrude from the inner wall surface of the hollow portion 44. Specifically, the four side wall portions 44S of the hollow portion 44 are provided with the plurality of elastic piece portions 90A, 90B, 90C, and 90D. These elastic piece portions 90A, 90B, 90C, and 90D are disposed so as to be displaced in the circumferential direction of the hollow portion 44.

Each of elastic piece portions 90A, 90B, 90C, and 90D is a plate spring extending in the sliding direction of the slider 50. These elastic piece portions 90A, 90B, 90C, and 90D are respectively formed on the four side wall portions 44S by cutting processing, for example.

One end portion (base end portion) 90E1 in the longitudinal direction of respective elastic piece portions 90A, 90B, 90C, and 90D is connected to the side wall portion 44S of the hollow portion 44. Each of the elastic piece portions 90A, 90B, 90C, and 90D is inclined toward the inside of the casing 42 starting from the one end portion 90E1. These elastic piece portions 90A, 90B, 90C, and 90D are each elastically deformable in the thickness direction of the side wall portion 44S with the one end portion 90E1 as a supporting point.

The other end portion (tip portion) 90E2 in the longitudinal direction of respective elastic piece portions 90A, 90B, 90C, and 90D is a free end portion. At the other end portion 90E2 of respective elastic piece portion 90A, 90B, 90C, and 90D, a bent portion which is bent so as to protrude into the interior of the casing 42 is formed. These bent portions are the casing-side contact portions 92A, 92B, 92C, and 92D.

The plurality of casing-side contact portions 92A, 92B, 92C, and 92D are disposed inside the hollow portion 44 of the casing 42. The plurality of casing-side contact portions 92A, 92B, 92C, 92D are disposed on the moving tracks (on the sliding tracks) of the plurality of slider-side contact portions 82A, 82B, 82C, and 82D, respectively.

Thus, as the slider 50 is inserted into the hollow portion 44, the plurality of slider-side contact portions 82A, 82B, 82C, and 82D come into contact with the plurality of casing-side contact portions 92A, 92B, 92C, and 92D, respectively and go over the plurality of casing-side contact portions 92A, 92B, 92C, and 92D. At this time, the slider 50 is moved in the intersecting direction (the direction of the arrow G) that intersects the sliding direction.

Figure 8A:
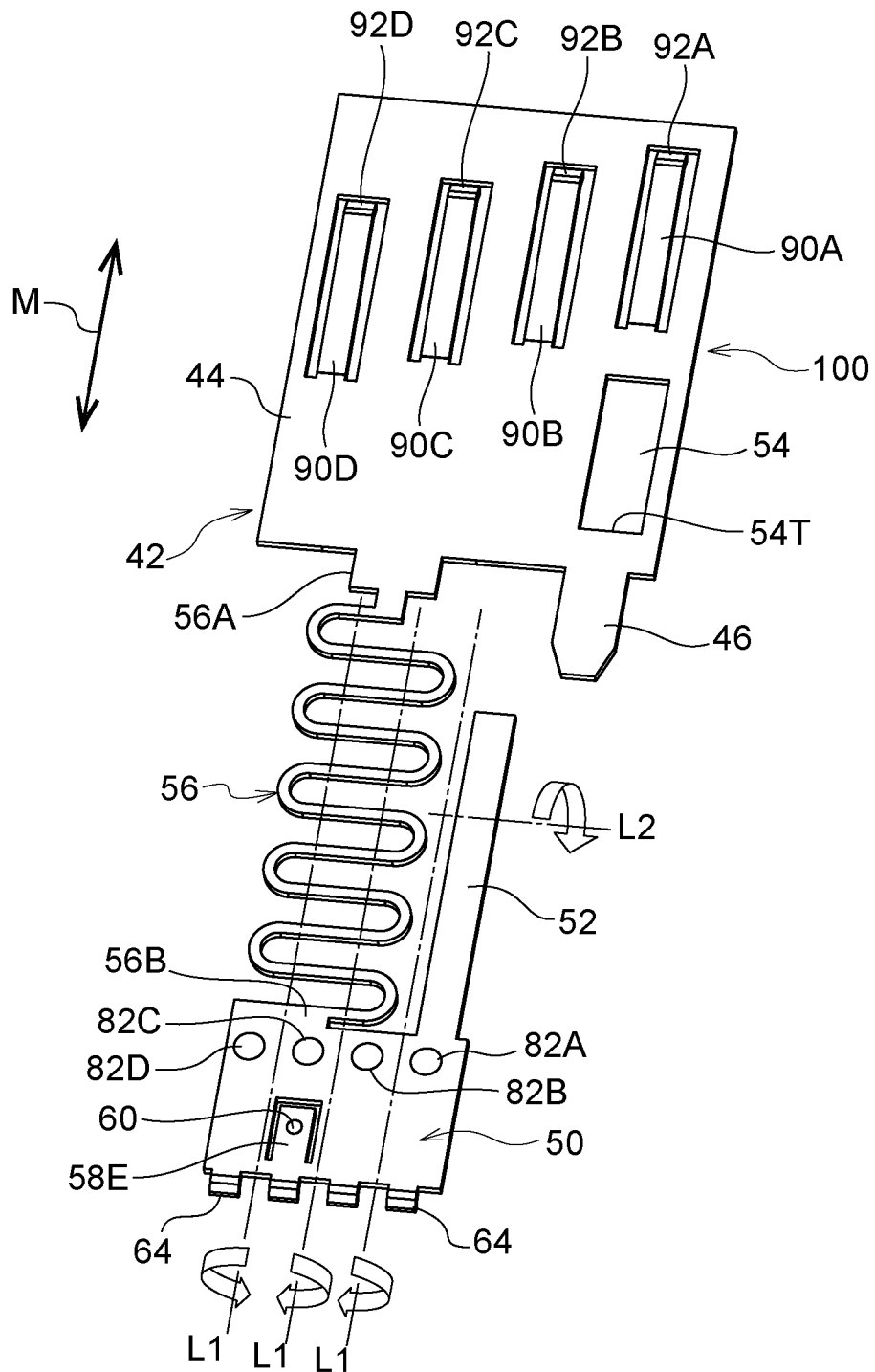
FIG. 8A is a developed view of the spring connector illustrated in FIG. 4.

FIG. 8A illustrates a developed view of the spring connector 40. As illustrated in FIG. 8A, the plurality of elastic piece portions 90A, 90B, 90C, and 90D are disposed so as to be displaced in the sliding direction (the direction of the arrow M) of the slider 50. Therefore, in the standby state of the slider 50, the intervals (the intervals in the sliding direction of the slider 50) between the plurality of casing-side contact portions 92A, 92B, 92C, and 92D and the plurality of slider-side contact portions 82A, 82B, 82C, and 82D are different from each other.

As a result, as the slider 50 is inserted into the hollow portion 44 of the casing 42, the plurality of slider-side contact portions 82A, 82B, 82C, and 82D do not come into contact with the plurality of casing-side contact portions 92A, 92B, 92C, and 92D at the same time and sequentially (in order) come into contact with the plurality of casing-side contact portions 92A, 92B, 92C, and 92D. In other words, in the present embodiment, the timing at which the plurality of slider-side contact portions 82A, 82B, 82C, and 82D come into contact with the plurality of casing-side contact portions 92A, 92B, 92C, and 92D is shifted.

[Method of Manufacturing Spring Connector]

Next, an example of a method of manufacturing the spring connector 40 will be described.

FIGS. 8A, 8B, 8C, and 8D illustrate a manufacturing process of the spring connector 40. Each region of a metal plate 100 illustrated in FIGS. 8A, 8B, 8C, and 8D is labeled with the corresponding component of the spring connector 40. The white arrows illustrated in FIGS. 8A, 8B, 8C, and 8D indicate the bending direction of the metal plate 100.

As illustrated in FIG. 8A, the spring connector 40 is formed by one piece of metal plate 100. The metal plate 100 is formed into a predetermined shape by punching processing, for example.

Figure 8B:
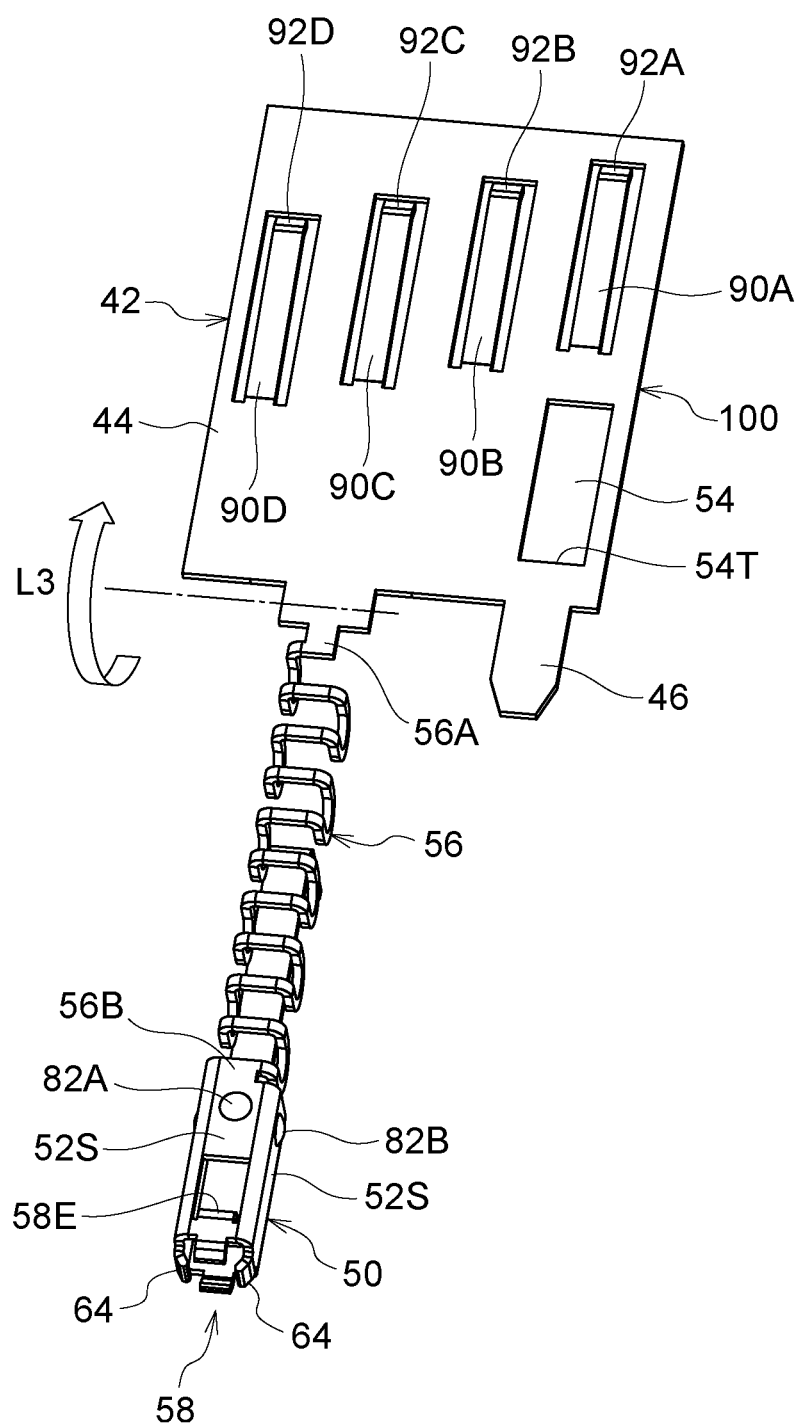
FIG. 8B is an explanatory view illustrating a manufacturing process of the spring connector illustrated in FIG. 4.

Next, a part of the metal plate 100 is bent along three single-dot chain lines L1 and is bent along one single-dot chain line L2. Thereby, as illustrated in FIG. 8B, the slider 50 and the elastic body 56 are formed.

Next, the slider 50 and the elastic body 56 are folded back to the metal plate 100 side which becomes the casing 42 along one single-dot chain line L3.

Figure 8C:
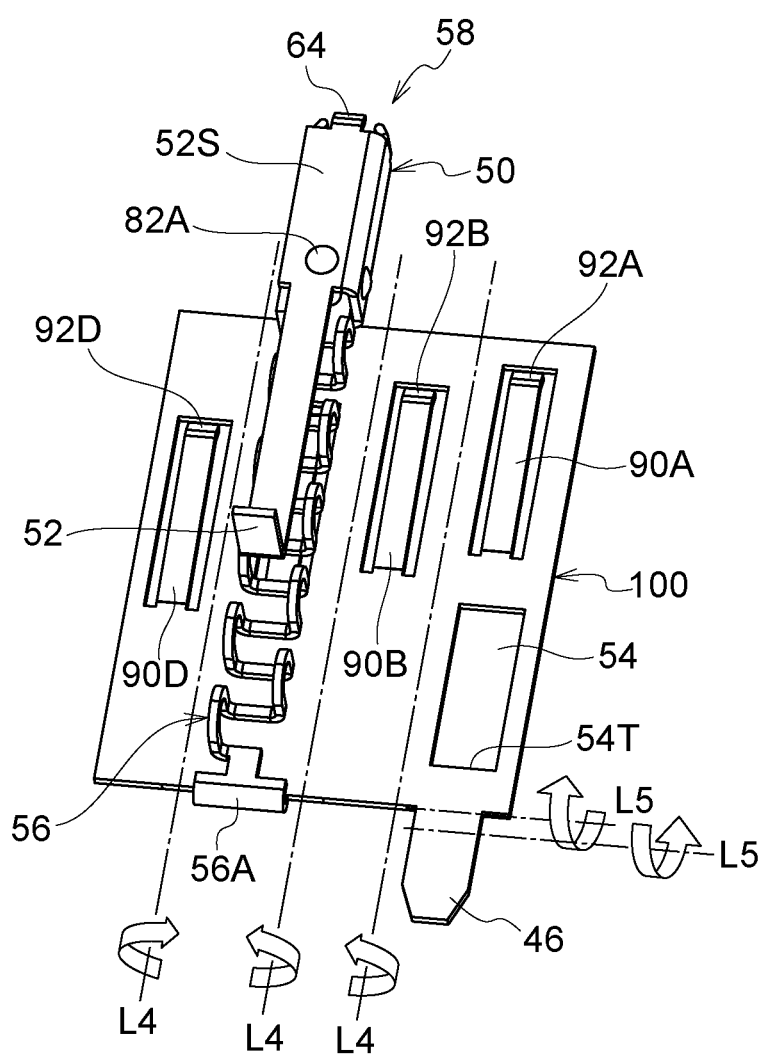
FIG. 8C is an explanatory view illustrating the manufacturing process of the spring connector illustrated in FIG. 4.
Figure 8D:
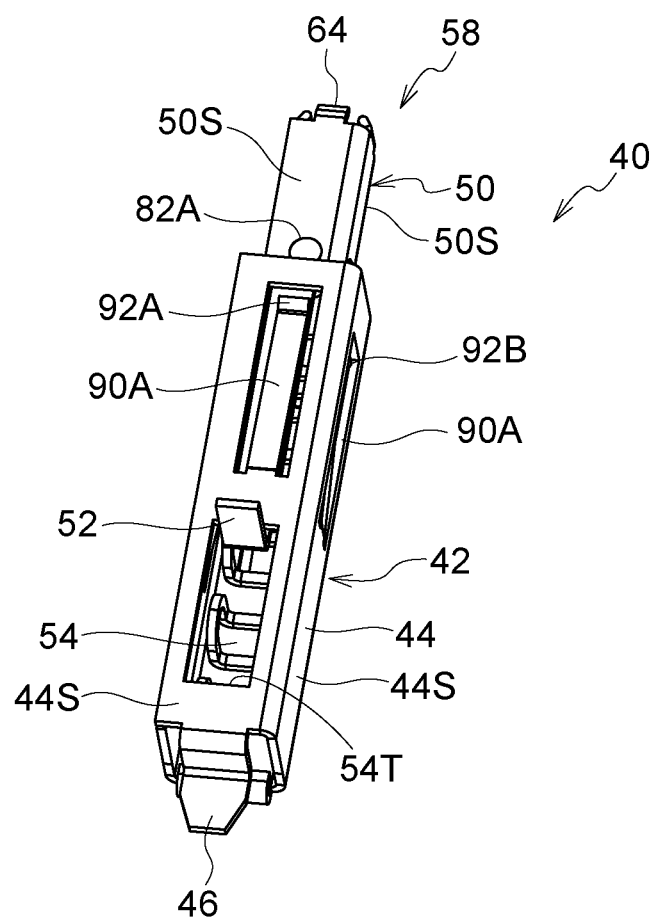
FIG. 8D is an explanatory view illustrating the manufacturing process of the spring connector illustrated in FIG. 4.

Next, as illustrated in FIG. 8C, a part of the metal plate 100 is bent along three single-dot chain lines L4. Thereby, the casing 42 is formed. At this time, the engaging arm portion 52 of the slider 50 is inserted into the stopper opening 54. A part of the metal plate 100 is bent along two single-dot lines L5. Thereby, the terminal portion 46 is formed. As illustrated in FIG. 8D, the spring connector 40 is formed.

In this way, in the present embodiment, the spring connector 40 is formed by one piece of metal plate 100. Thus, in the present embodiment, it is possible to reduce the number of manufacturing steps (man-hour of assembling) of the spring connector 40, as compared with a case where a spring connector is formed by combining a plurality of components.

In the present embodiment, as described above, the spring connector 40 is formed by one piece of metal plate 100. Thus, in the present embodiment, the casing 42, the elastic body 56, and the slider 50 may be more reliably and electrically connected, as compared with a case where a spring connector is formed by combining a plurality of components.

The spring connector 40 is not limited to one piece of metal plate 100 and may be formed of a plurality of pieces of metal plates.

[Action]

Next, the operation of the present embodiment will be described.

Figure 9A:
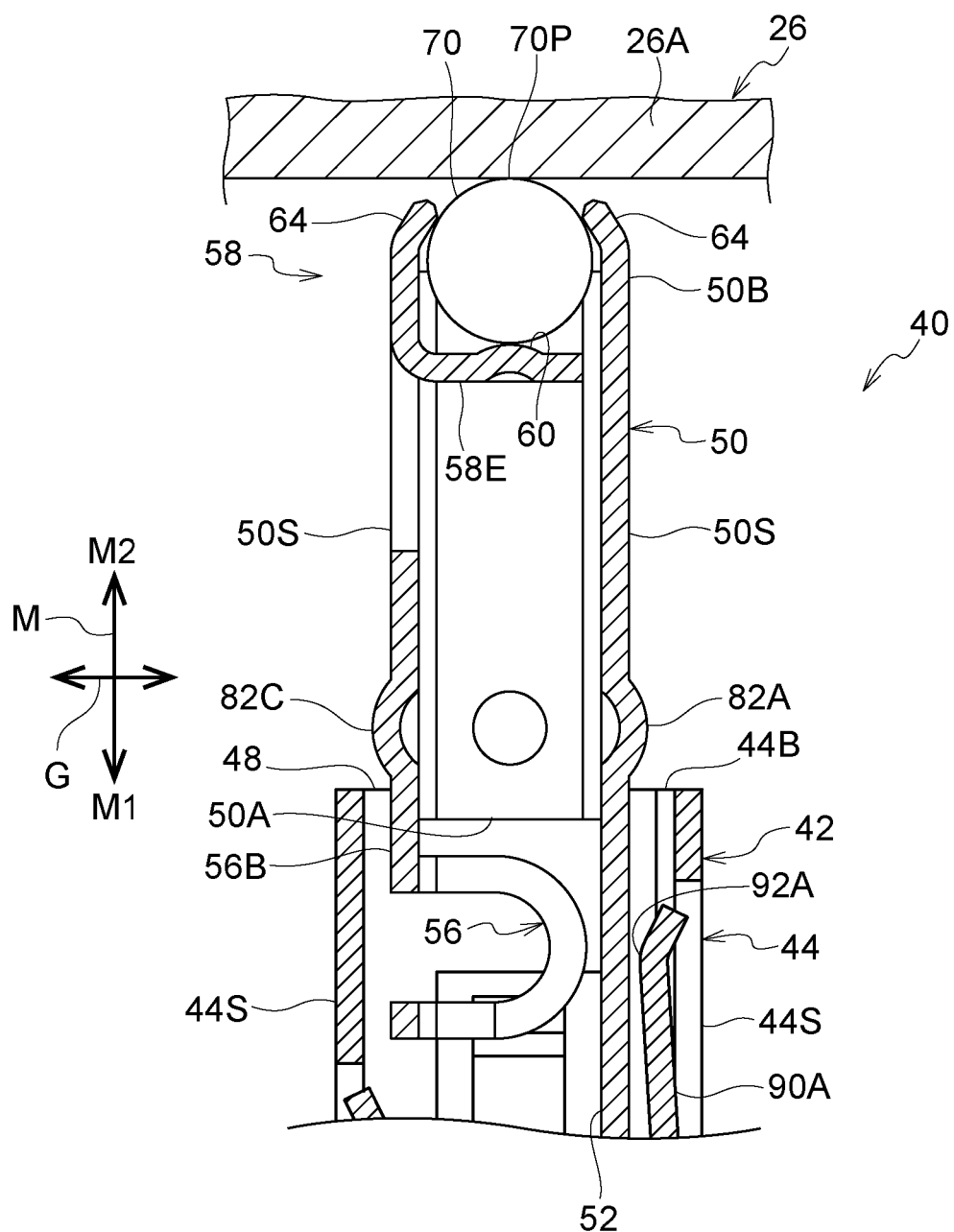
FIG. 9A is an enlarged cross-sectional view illustrating a state in which a contact point of the main body device side connector is in contact with the movable spherical body of the spring connector in FIG. 5.

As illustrated in FIG. 2, in a case where the user installs the main body device 20 on the expansion device 30, the user inserts the one end portion 24E of the main body device 20 into the mounting portion 34 of the expansion device 30. When one end portion 24E of the main body device 20 is inserted into the mounting portion 34, as illustrated in FIG. 9A, the contact point 26A of the main body device side connector 26 comes into contact with the movable spherical body 70 of the spring connector 40 of the expansion device side connector 36.

Figure 9B:
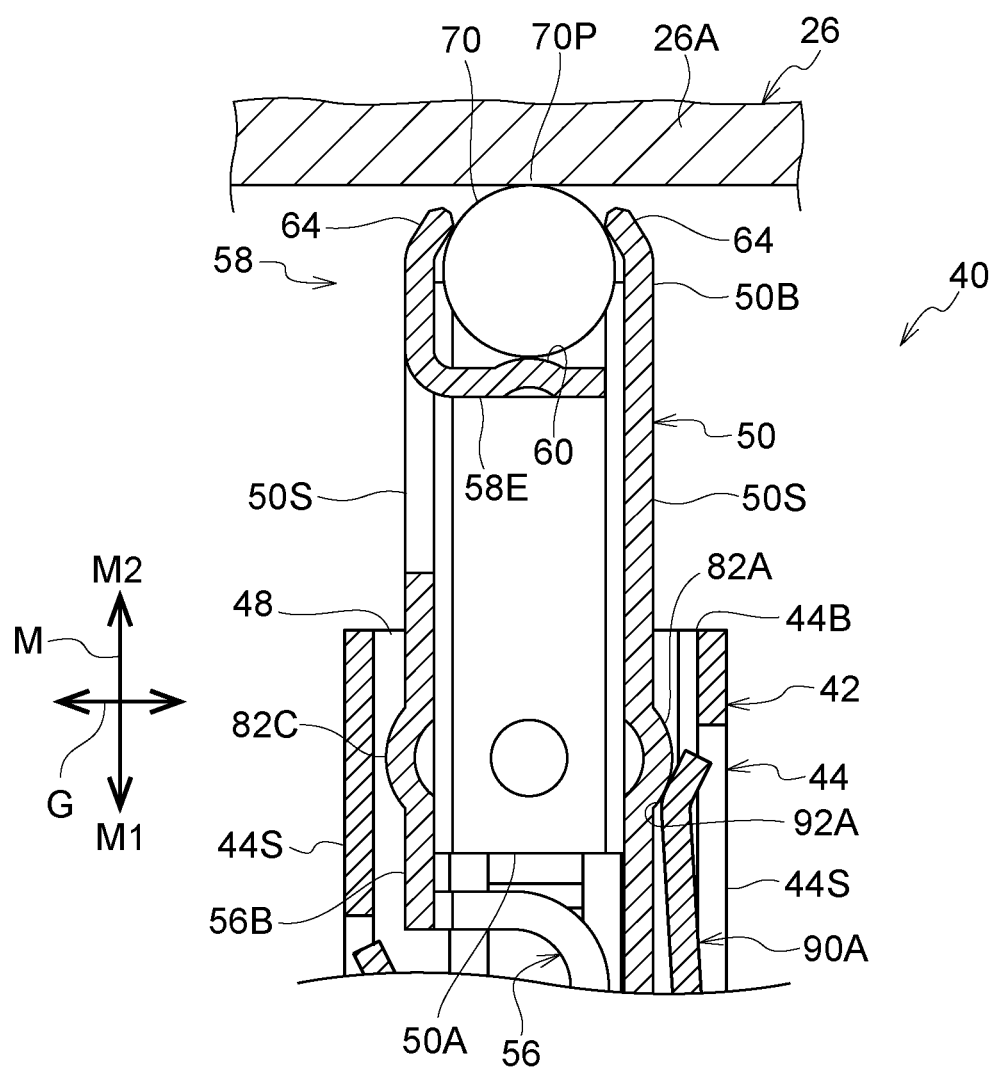
FIG. 9B is an enlarged cross-sectional view illustrating a state in which a slider-side contact portion is in contact with a casing-side contact portion in FIG. 5.

In this state, when the user further inserts the one end portion 24E of the main body device 20 into the mounting portion 34, as illustrated in FIG. 9B, the movable spherical body 70 is pushed toward the casing 42 (the direction of the arrow M1) by the contact point 26A. As a result, the slider 50 is pushed into the hollow portion 44 of the casing 42 and the elastic body 56 is compressed. As a result, the slider-side contact portion 82A comes into contact with the casing-side contact portion 92A.

Figure 9C:
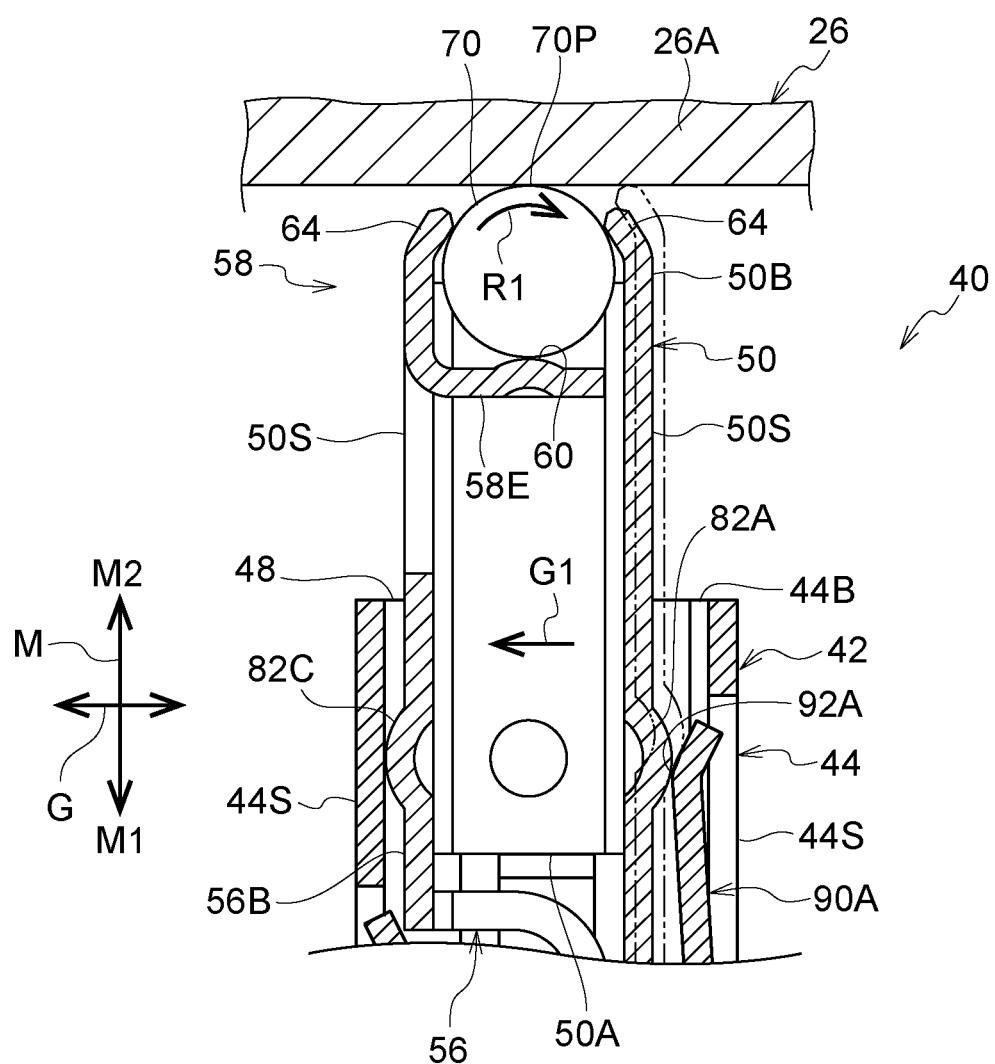
FIG. 9C is an enlarged cross-sectional view illustrating a state in which the slider-side contact portion rides on the casing-side contact portion in FIG. 5.

Next, when the slider 50 is further pushed into the hollow portion 44, as illustrated in FIG. 9C, the slider-side contact portion 82A rides on the casing-side contact portion 92A. As a result, as illustrated by an arrow G1, the slider 50 slightly moves in the intersecting direction that intersects the sliding direction.

Here, the movable spherical body 70 is pressed against the contact point 26A of the main body device side connector 26 by the restoring force of the elastic body 56. In this state, as indicated by the arrow G1, when the slider 50 moves in the intersecting direction, the movable spherical body 70 slightly rotates in the direction of an arrow R1 due to the frictional force generated at the contact portion between the movable spherical body 70 and the contact point 26A. Alternatively, the movable spherical body 70 slightly rotates by the reaction when the slider-side contact portion 82A rides on the casing-side contact portion 92A. As a result, the contact portion between the contact point 26A of the main body device side connector 26 and the movable spherical body 70 is displaced.

Figure 9D:
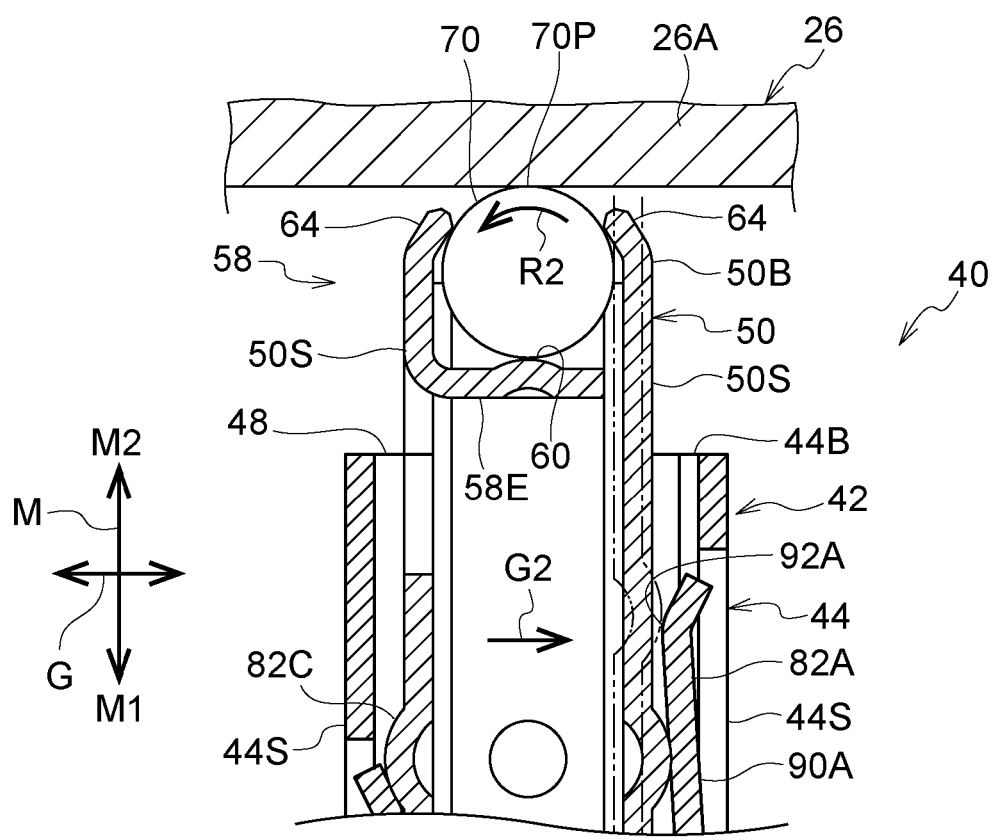
FIG. 9D is an enlarged cross-sectional view illustrating a state in which the slider-side contact portion goes over the casing-side contact portion in FIG. 5.

Next, as illustrated in FIG. 9D, when the slider 50 is further pushed into the hollow portion 44, the slider-side contact portion 82A passes through the casing-side contact portion 92A. As a result, the slider 50 moves in the intersecting direction as indicated by an arrow G2.

Here, as described above, the movable spherical body 70 is pressed against the contact point 26A of the main body device side connector 26 by the restoring force of the elastic body 56. In this state, as indicated by the arrow G2, when the slider 50 moves in the intersecting direction, the movable spherical body 70 slightly rotates in the direction of an arrow R2 due to the frictional force generated at the contact portion between the movable spherical body 70 and the contact point 26A. Alternatively, the movable spherical body 70 slightly rotates by the reaction when the slider-side contact portion 82A goes over the casing-side contact portion 92A. As a result, the contact portion between the contact point 26A of the main body device side connector 26 and the movable spherical body 70 is displaced.

In FIGS. 9C and 9D, the slider 50 moves horizontally in the directions of the arrows G1 and G2, but strictly speaking, the slider 50 moves in the directions of the arrows G1 and G2 while being inclined with respect to the sliding direction. Since the frictional force generated at a contact portion 70P of the movable spherical body 70 varies due to the inclination of the slider 50 or the like, a difference occurs in the amount of rotation of the movable spherical body 70 in the directions of the arrows R1 and R2. Accordingly, even if the slider 50 moves in both the directions of the arrows G1 and G2, the contact portion 70P of the movable spherical body 70 with respect to the contact point 26A of the main body device side connector 26 is displaced.

When the slider-side contact portion 82A goes over the casing-side contact portion 92A, the elastic piece portion 90A is slightly elastically deformed to the outside of the casing 42 with the one end portion 90E1 as a supporting point. Thereby, damage of the slider-side contact portion 82A and the casing-side contact portion 92A and the like are suppressed.

Figure 9E:
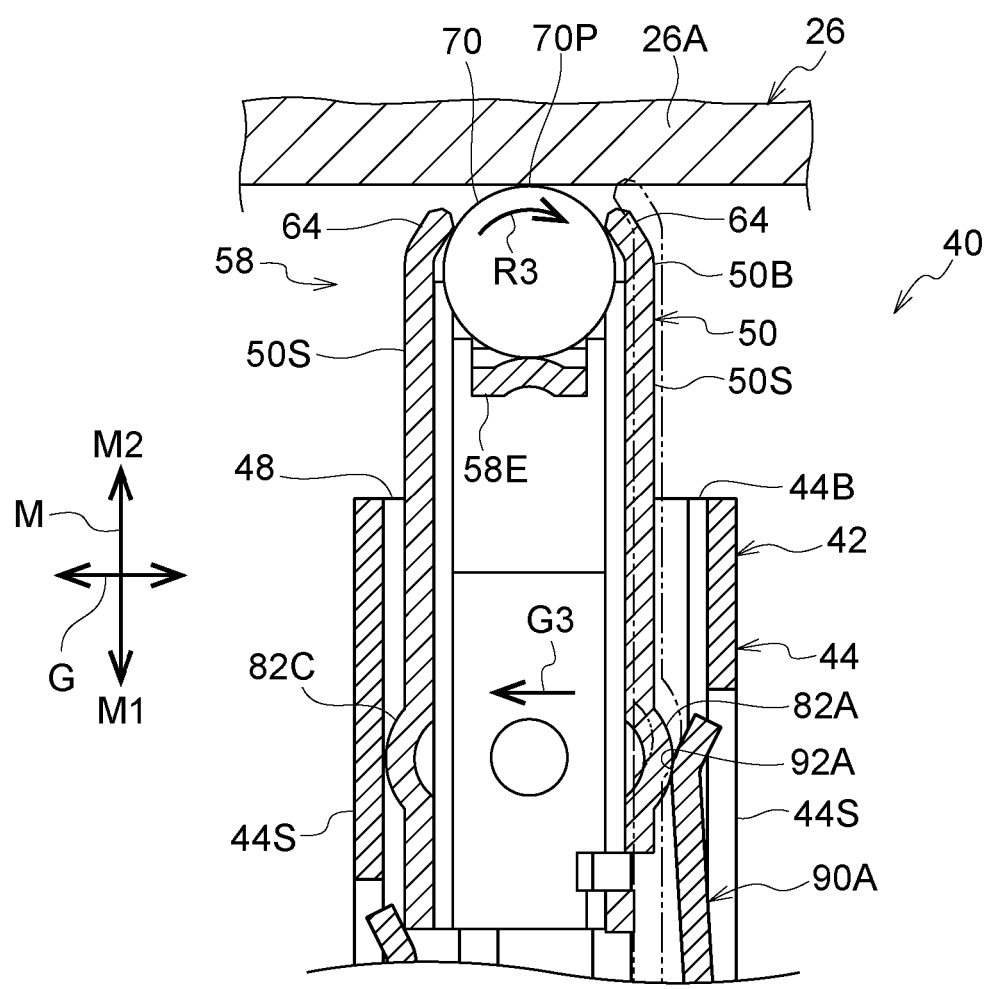
FIG. 9E is an enlarged cross-sectional view illustrating a state in which the slider-side contact portion is in contact with the casing-side contact portion in FIG. 6.

Next, when the slider 50 is further pushed into the hollow portion 44, as illustrated in FIG. 9E, the slider-side contact portion 82B rides on the casing-side contact portion 92B. As a result, as illustrated by an arrow G3, the slider 50 moves in the intersecting direction different from the arrows G1 and G2 (see FIGS. 9C and 9D). At this time, the movable spherical body 70 slightly rotates in the direction of an arrow R3. As a result, the contact portion 70P of the movable spherical body 70 with respect to the contact point 26A of the main body device side connector 26 is further displaced.

Next, although not illustrated, when the slider 50 is further pushed into the hollow portion 44, the slider-side contact portions 82C and 82D go over the casing-side contact portions 92C and 92D, respectively. At this time, the slider 50 respectively swings in the intersecting direction. As a result, the movable spherical body 70 slightly rotates, and the contact portion 70P of the movable spherical body 70 with respect to the contact point 26A of the main body device side connector 26 is further displaced.

When the one end portion 24E of the main body device 20 is mounted on the mounting portion 34, the slider 50 is in an insertion state of being inserted into the casing 42. In this insertion state, the contact point 26A of the main body device side connector 26 is electrically connected to a printed circuit board (not illustrated) housed in the expansion device 30 via the movable spherical body 70, the slider 50, the elastic body 56, the casing 42, and the terminal portion 46.

Next, in a case where the user detaches the main body device 20 from the mounting portion 34 of the expansion device 30, the user pulls out the one end portion 24E of the main body device 20 from the mounting portion 34 of the expansion device 30. As a result, the slider 50 is pushed toward the protruding direction (the direction of arrow M2) by the restoring force of the elastic body 56. As a result, the slider 50 slides with respect to the casing 42 and protrudes from the opening 48 of the casing 42. That is, the slider 50 is shifted from the insertion state to the standby state.

At this time, the slider-side contact portions 82A, 82B, 82C, and 82D go over the casing-side contact portions 92A, 92B, 92C, and 92D, respectively. As a result, the slider 50 swings in the intersecting direction. Accordingly, the movable spherical body 70 slightly rotates, and the contact portion 70P of the movable spherical body 70 with respect to the contact point 26A of the main body device side connector 26 is further displaced.

As described above, in the present embodiment, the slider 50 swings in the intersecting direction as the slider 50 slides with respect to the hollow portion 44 of the casing 42. As a result, the movable spherical body 70 slightly rotates, and the contact portion 70P of the movable spherical body 70 with respect to the contact point 26A of the main body device side connector 26 is further displaced. As a result, repeated contact of the contact point 26A of the main body device side connector 26 with the same portion of the movable spherical body 70 is suppressed. Accordingly, damage to the movable spherical body 70 is suppressed. Therefore, poor connection between the main body device side connector 26 and the movable spherical body 70 is suppressed.

As illustrated in FIG. 7, the gap 66 is formed between the movable spherical body 70 and each claw portion 64 in a state where the movable spherical body 70 and the protruding portion 60 are in contact with each other. As a result, in the present embodiment, the movable spherical body 70 is more likely to rotate within the spherical body housing portion 58, as compared with a case where any one of the plurality of claw portions 64 comes into contact with the movable spherical body 70. Accordingly, the contact portion 70P of the movable spherical body 70 with respect to the contact point 26A of the main body device side connector 26 is easily displaced.

Here, in a case where the movable spherical body 70 makes one rotation in a predetermined direction, the contact portion 70P of the movable spherical body 70 with respect to the contact point 26A of the main body device side connector 26 becomes the same before and after the rotation and the contact portion 70P of the movable spherical body 70 is easily damaged.

As a measure against this, in the present embodiment, the plurality of slider-side contact portions 82A, 82B, 82C, and 82D are provided on the four side wall portions 50S of the slider 50. The plurality of casing-side contact portions 92A, 92B, 92C, and 92D are provided on the four side wall portions 44S of the hollow portion 44. Therefore, when the plurality of slider-side contact portions 82A, 82B, 82C, and 82D go over the plurality of casing-side contact portions 92A, 92B, 92C, and 92D, respectively, the slider 50 swings in different intersecting directions. Thereby, it is suppressed that the movable spherical body 70 makes one rotation in the predetermined direction. Accordingly, damage to the movable spherical body 70 is further suppressed.

The plurality of slider-side contact portions 82A, 82B, 82C, and 82D are disposed at the same position in the sliding direction of the slider 50. On the other hand, the plurality of casing-side contact portions 92A, 92B, 92C, and 92D are disposed so as to be displaced in the sliding direction of the slider 50. As a result, as the slider 50 slides with respect to the hollow portion 44, the plurality of slider-side contact portions 82A, 82B, 82C, and 82D sequentially go over the plurality of casing-side contact portions 92A, 92B, 92C, and 92D.

Therefore, in the present embodiment, the slider 50 is more likely to slide with respect to the casing 42, as compared with a case where the plurality of slider-side contact portions go over the plurality of casing-side contact portions at the same time. Accordingly, one end portion 24E of the main body device 20 may be easily mounted on the expansion device 30.

When the slider-side contact portions 82A, 82B, 82C, and 82D go over the casing-side contact portions 92A, 92B, 92C, and 92D, the elastic piece portions 90A, 90B, 90C, and 90D are elastically deformed toward the outside of the hollow portion 44 with the one end portion 90E1 as a supporting point. As a result, damage to the slider-side contact portions 82A, 82B, 82C, and 82D and the casing-side contact portions 92A, 92B, 92C, and 92D is suppressed.

[Analysis Result]

Figure 10:
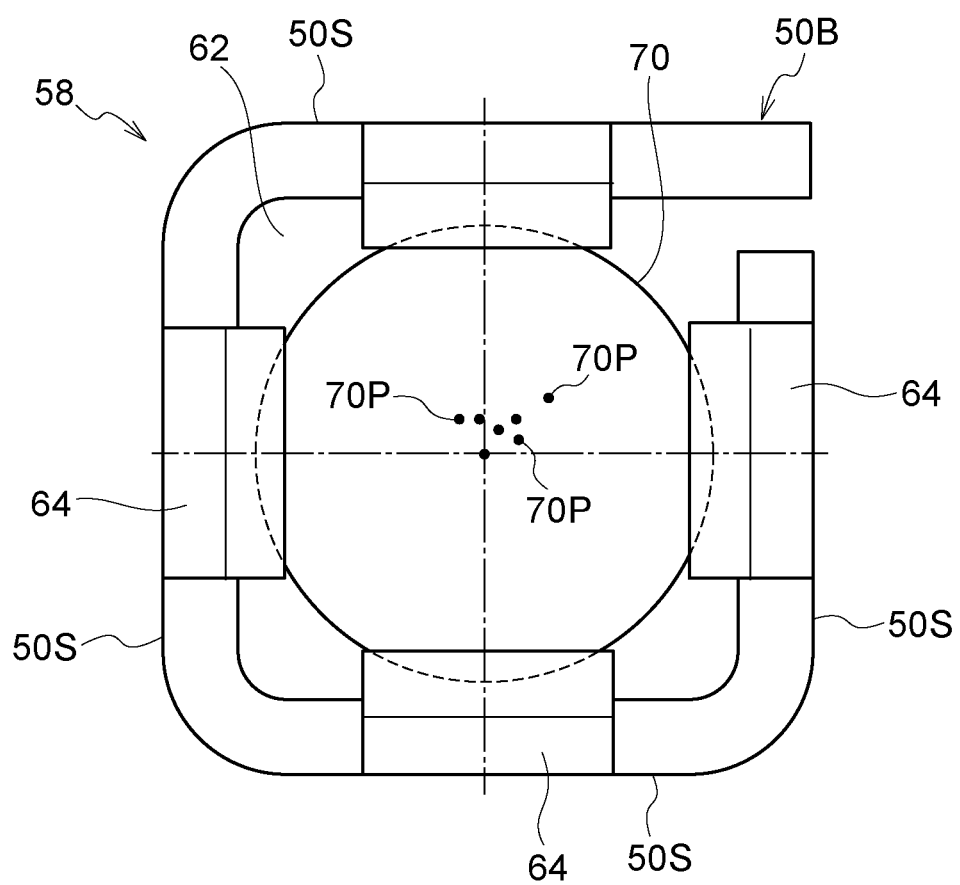
FIG. 10 is a plan view of the spring connector illustrating an analysis result of a contact portion of the movable spherical body with which the contact point of the main body device side connector is brought into contact.

Here, FIG. 10 illustrates the analysis result of the contact portion (contact point) 70P of the movable spherical body 70 with respect to the contact point 26A of the main body device side connector 26.

In this analysis, when the movable spherical body 70 and the slider 50 are pushed into the hollow portion 44 of the casing 42 by the contact point 26A of the main body device side connector 26, variation (displacement) of the contact portion (contact point) 70P of the movable spherical body 70 with respect to the contact point 26A was obtained by analysis. In the present analysis, the point at which the stress received from the contact point 26A is the maximum on the outer surface of the movable spherical body 70 is the contact portion 70P.

As illustrated in FIG. 10, it was confirmed that the contact portion 70P of the movable spherical body 70 with respect to the contact point 26A is displaced when the movable spherical body 70 and the slider 50 are pushed into the hollow portion 44 of the casing 42 by the contact point 26A of the main body device side connector 26.

[Modification Example]

Next, a modification example of the above embodiment will be described.

Figure 11:
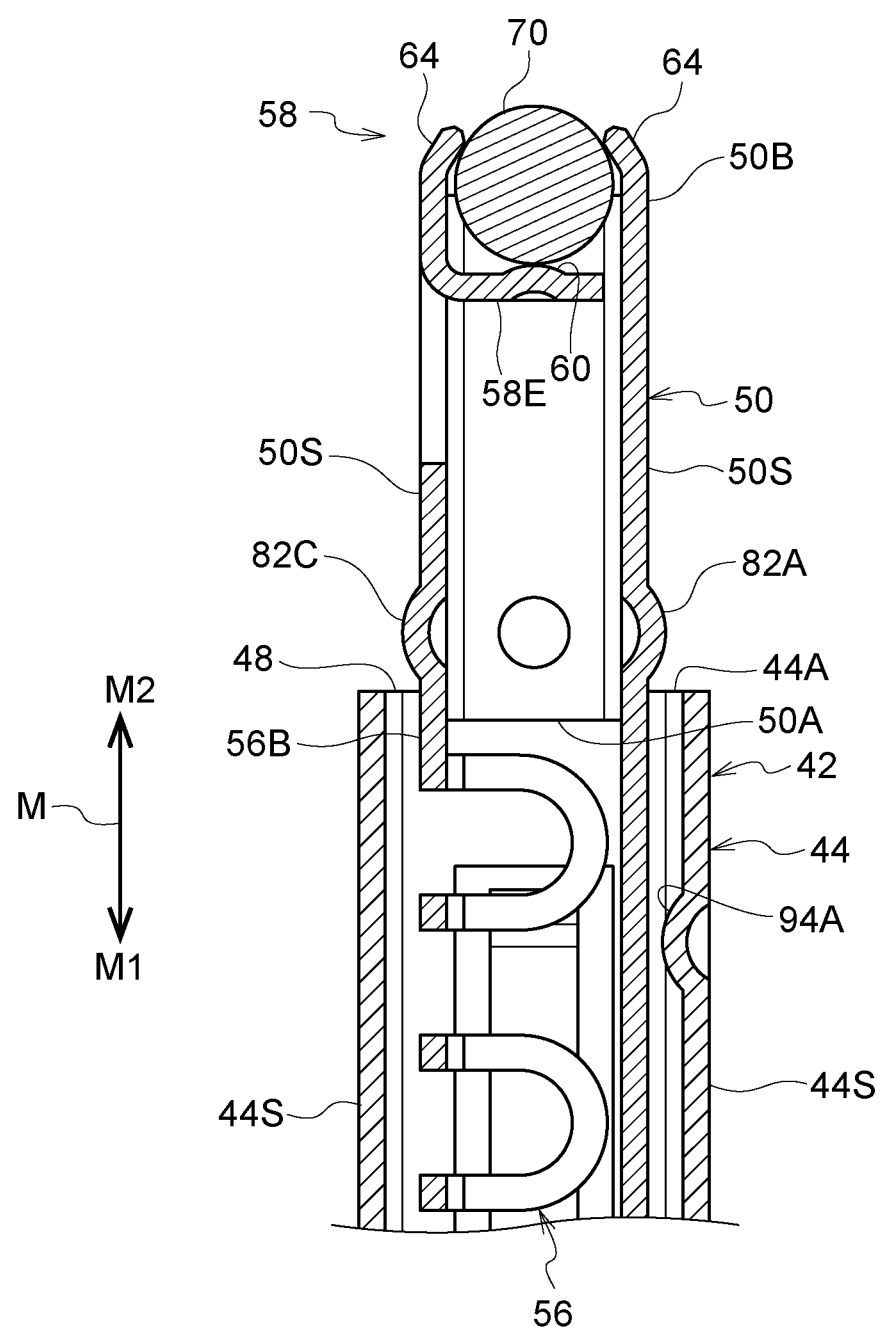
FIG. 11 is a cross-sectional view corresponding to FIG. 9A illustrating a modification example of the casing-side contact portion.

In the above embodiment, the casing-side contact portions 92A, 92B, 92C, and 92D are provided on the elastic piece portions 90A, 90B, 90C, and 90D. However, as illustrated in FIG. 11, a casing-side contact portion 94A may be provided on the side wall portion 44S of the hollow portion 44, for example. For example, the casing-side contact portion 94A protrudes in a protruding manner from the inner wall surface of the side wall portion 44S of the hollow portion 44.

In the above embodiment, the slider-side contact portions 82A, 82B, 82C, and 82D are provided on the side wall portion 50S of the slider 50. However, the slider-side contact portion may be provided, for example, in the elastic piece portion formed on the side wall portion 50S of the slider 50.

In the above embodiment, the slider-side contact portions 82A, 82B, 82C, and 82D are respectively provided on the four side wall portions 50S of the slider 50, and the casing-side contact portions 92A, 92B, 92C, 92D are provided on the four side wall portions 44S of the casing 42. However, for example, a slider-side contact portion may be provided on one side wall portion 50S of the slider 50, and a plurality of casing-side contact portions with which the slider-side contact portions are sequentially brought into contact may be provided on one side wall portion 44S of the casing 42. Conversely, for example, a casing-side contact portion may be provided on one side wall portion 44S of the casing 42, and a plurality of slider-side contact portions that are sequentially brought into contact with the casing-side contact portions may be provided on one side wall portion 50S of the slider 50.

At least one slider-side contact portion may be provided on the slider. Similarly, at least one casing-side contact portion may be provided on the casing.

In the above embodiment, as the slider 50 slides with respect to the casing 42, the slider-side contact portions 82A, 82B, 82C, and 82D go over the casing-side contact portions 92A, 92B, 92C, and 92D. However, on the casing, for example, a casing-side contact portion on which the slider-side contact portion rides may be provided. The casing-side contact portion is formed over a wide range of the casing, for example, so that the slider-side contact portion does not go over.

In the above embodiment, the plurality of slider-side contact portions 82A, 82B, 82C, and 82D are disposed at the same position in the sliding direction of the slider 50, and the plurality of case-side contact portions 92A, 92B, 92C, and 92D are disposed so as to be displaced in the sliding direction of the slider 50. However, for example, the plurality of slider-side contact portions may be disposed so as to be displaced in the sliding direction of the slider 50, and the plurality of casing-side contact portions may be disposed at the same position in the sliding direction of the slider 50. For example, the plurality of slider-side contact portions and the plurality of casing-side contact portions may be disposed so as to be displaced in the sliding direction of the slider 50, respectively.

In the above embodiment, the spring connector 40 is provided on the expansion device 30. However, the spring connector 40 may be provided in the main body device 20.

The spring connector 40 according to the above embodiment may be applied to various electronic devices.

Although the embodiment of the technique disclosed by the present application has been described above, the technique disclosed by the present application is not limited to the above embodiment. It is a matter of course that the embodiment and various modification examples may be used in combination as appropriate or various embodiments may be carried out without departing from the gist of the technique disclosed in the present application.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A connector comprising:
  a casing configured to include a first contactor;
  a slider capable of insertion into the casing and configured to include a second contactor;
  an elastic body provided in the casing, the elastic body causing the slider to protrude from the casing; and
  a movable spherical body rotatably provided at a tip of the slider,
  wherein, when the slider is inserted into the casing, the first contactor comes in contact with the second contactor and the slider is moved in an intersecting direction that intersects an insertion direction of the slider.

2. The connector according to claim 1,
  wherein the first contactor swings the tip provided with the movable spherical body of the slider in the intersecting direction in accordance with a contact with the second contactor.

3. The connector according to claim 1,
wherein the first contactor is provided over an inner wall surface of the casing, and
wherein the second contactor is provided over an outer wall surface of the slider.

4. The connector according to claim 3,
wherein the first contactor protrudes from the inner wall surface of the casing, and
wherein the second contactor protrudes from the outer wall surface of the slider.

5. The connector according to claim 1, further comprising:
a plurality of first contactors provided over an inner wall surface of the casing, the second contactor sequentially coming into contact with the plurality of first contactors when the slider is inserted into the casing.

6. The connector according to claim 1, further comprising:
a plurality of second contactors provided over an outer wall surface of the slider, the first contactor sequentially coming into contact with the plurality of second contactors when the slider is inserted into the casing.

7. The connector according to claim 1, further comprising:
a plurality of first contactors provided over an inner wall surface of the casing; and
a plurality of second contactors provided over an outer wall surface of the slider,
wherein the plurality of second contactors sequentially come into contact with the plurality of first contactors when the slider is inserted into the casing.

8. The connector according to claim 7,
wherein the plurality of first contactors move the slider in different intersecting directions.

9. The connector according to claim 7,
wherein the plurality of first contactors are disposed to be displaced from each other in the insertion direction or the plurality of second contactors are disposed to be displaced from each other in the insertion direction, or the plurality of first contactors are disposed to be displaced from each other in the insertion direction while the plurality of second contactors are disposed to be displaced from each other in the insertion direction.

10. The connector according to claim 7,
wherein the plurality of first contactors are disposed so as to be displaced from each other in a circumferential direction of the casing, and
wherein the plurality of second contactors are disposed to be displaced from each other in a circumferential direction of the slider.

11. The connector according to claim 10,
wherein the casing has a hollow into which the slider is slidably inserted, and
wherein the plurality of first contactors are respectively provided over four side walls of the hollow.

12. The connector according to claim 7,
wherein the slider has four side walls, and
wherein the plurality of second contactors are respectively provided over the four side walls of the slider.

13. The connector according to claim 1,
wherein the second contactor rides over the first contactor when the slider is inserted into the casing.

14. The connector according to claim 1,
wherein the second contactor goes over the first contactor when the slider is inserted into the casing.

15. The connector according to claim 1, further comprising:
an elastic piece provided over the casing and configured to be elastically deformable in the intersecting direction,
wherein the first contactor is provided over the elastic piece.

16. The connector according to claim 1,
wherein the casing and the slider are coupled to each other by the elastic body.

17. The connector according to claim 1,
wherein the casing, the slider, the elastic body, and the movable spherical body have conductivity.

18. The connector according to claim 17,
wherein the casing, the slider, the elastic body, and the movable spherical body are electrically coupled to each other.

19. The connector according to claim 1,
wherein the casing includes a terminal coupled to a substrate.

20. An electronic apparatus comprising:
a connector configured to include:
a casing configured to include a first contactor,
a slider capable of insertion into the casing and configured to include a second contactor,
an elastic body provided in the casing, the elastic body causing the slider to protrude from the casing, and
a movable spherical body rotatably provided at a tip of the slider; and
a substrate coupled to the connector,
wherein, when the slider is inserted into the casing, the first contactor comes in contact with the second contactor and the slider is moved in an intersecting direction that intersects an insertion direction of the slider.

* * * * *